US010185407B2

(12) United States Patent
Uemura et al.

(10) Patent No.: US 10,185,407 B2
(45) Date of Patent: Jan. 22, 2019

(54) DISPLAY CONTROL APPARATUS, DISPLAY CONTROL METHOD AND RECORDING MEDIUM

(71) Applicant: CANON KABUSHIKI KAISHA, Tokyo (JP)

(72) Inventors: Kiyohiro Uemura, Tokyo (JP); Tatsuya Kimoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 15/237,376

(22) Filed: Aug. 15, 2016

(65) Prior Publication Data
US 2017/0052603 A1 Feb. 23, 2017

(30) Foreign Application Priority Data
Aug. 18, 2015 (JP) ................. 2015-160975

(51) Int. Cl.
G06F 3/0346 (2013.01)
G06F 3/01 (2006.01)
G06F 3/038 (2013.01)
G06F 3/03 (2006.01)
G06F 3/0484 (2013.01)

(52) U.S. Cl.
CPC ............ *G06F 3/0346* (2013.01); *G06F 3/017* (2013.01); *G06F 3/0304* (2013.01); *G06F 3/038* (2013.01); *G06F 3/04842* (2013.01); *G06F 3/04845* (2013.01)

(58) Field of Classification Search
CPC ........ G06F 3/0346; G06F 3/017; G06F 3/038; G06F 3/0304; G06F 3/04845; G06F 3/04843
See application file for complete search history.

(56) References Cited

U.S. PATENT DOCUMENTS

| 2006/0136846 A1* | 6/2006 | Im ............................ G06F 3/017 715/863 |
| 2008/0089587 A1* | 4/2008 | Kim ......................... G06F 3/017 382/190 |
| 2011/0117526 A1* | 5/2011 | Wigdor ................... G09B 13/00 434/118 |
| 2011/0117535 A1* | 5/2011 | Benko ................. G06F 3/04883 434/365 |
| 2011/0119640 A1* | 5/2011 | Berkes ..................... G06F 3/011 715/863 |
| 2014/0104161 A1* | 4/2014 | Liao ......................... G06F 3/017 345/156 |
| 2014/0225918 A1* | 8/2014 | Mittal ...................... G06F 3/017 345/633 |

FOREIGN PATENT DOCUMENTS

| JP | 2013-200654 A | 10/2013 |
| JP | 2014-99184 A | 5/2014 |

* cited by examiner

Primary Examiner — Ariel Balaoing
(74) Attorney, Agent, or Firm — Canon U.S.A., Inc. IP Division

(57) ABSTRACT

A display control apparatus displays a cursor based on an operation performed by an operator on a screen of a display device. The display controlling unit corrects the in-screen position of the instruction image based on a relationship between a first position indicated by the hand having a first shape and a second position indicated by the hand having a second shape in a case where a second operation is detected after a first operation is detected and displays the instruction image at the in-screen position corresponding to the second position.

18 Claims, 14 Drawing Sheets

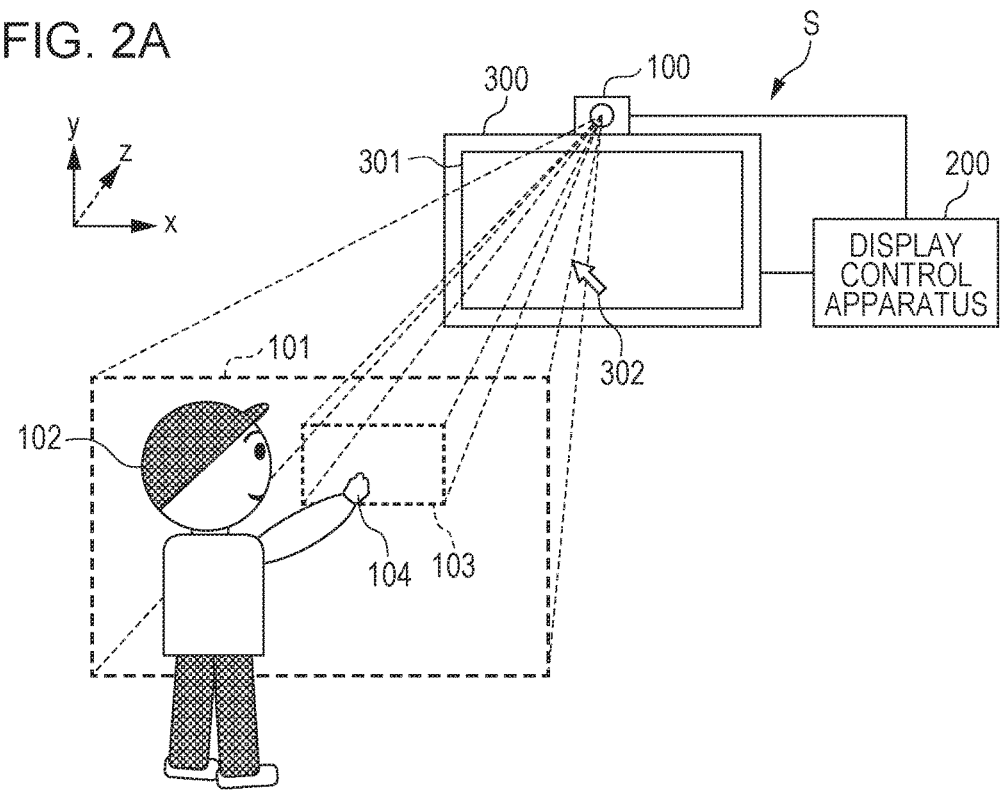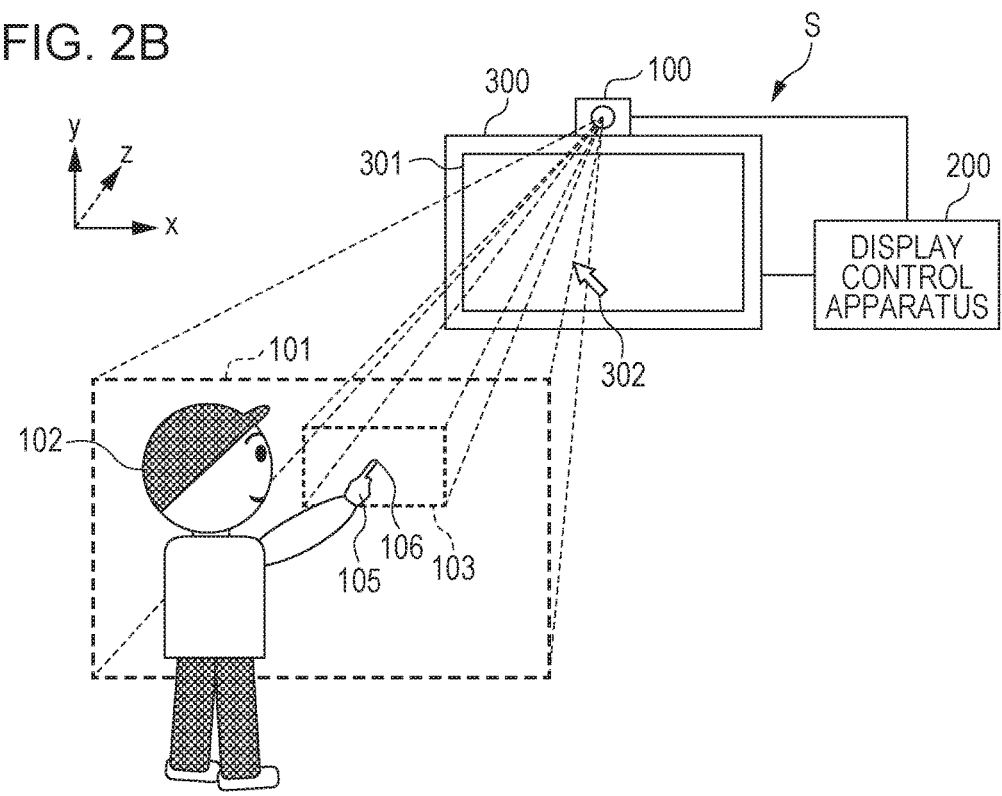

FIG. 4A
FIG. 4B
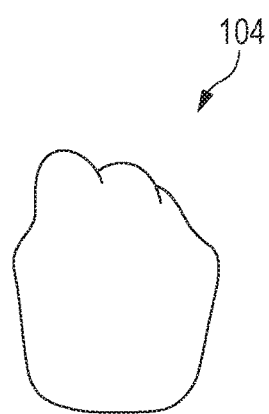
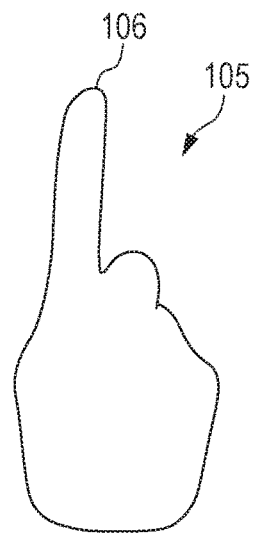
FIG. 5A
FIG. 5B
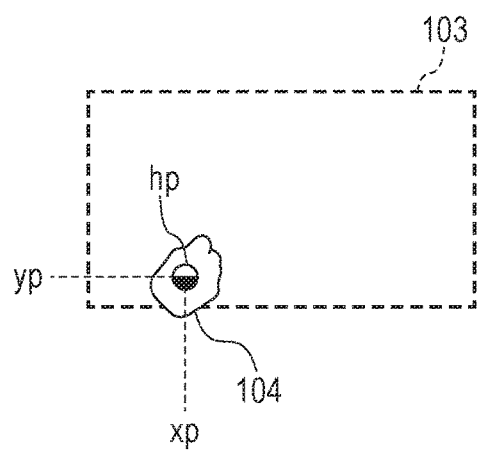
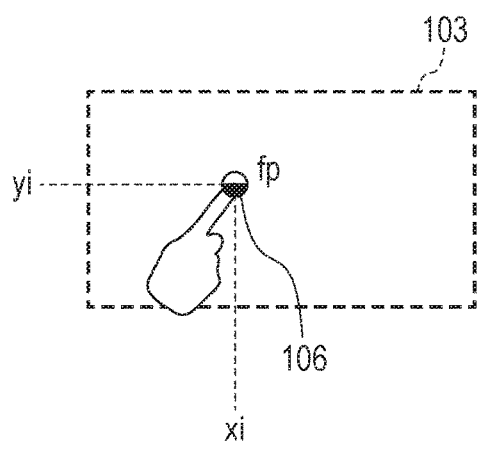

FIG. 6

| SHAPE OF HAND | | | | | | GESTURE |
|---|---|---|---|---|---|---|
| HAND | THUMB | INDEX | MIDDLE | RING | LITTLE | |
| 0 | 0 | 0 | 0 | 0 | 0 | NONE |
| 1 | 0 | 0 | 0 | 0 | 0 | CLOSED |
| 1 | 1 | 1 | 1 | 1 | 1 | OPEN |
| 1 | 0 | 1 | 0 | 0 | 0 | POINT |

| GESTURE | OPERATION |
|---------|-----------|
| NONE | NONE |
| CLOSED | MOVE CURSOR |
| POINT | PRESS BUTTON |
| OPEN | MOVE IMAGE DISPLAY POSITION |

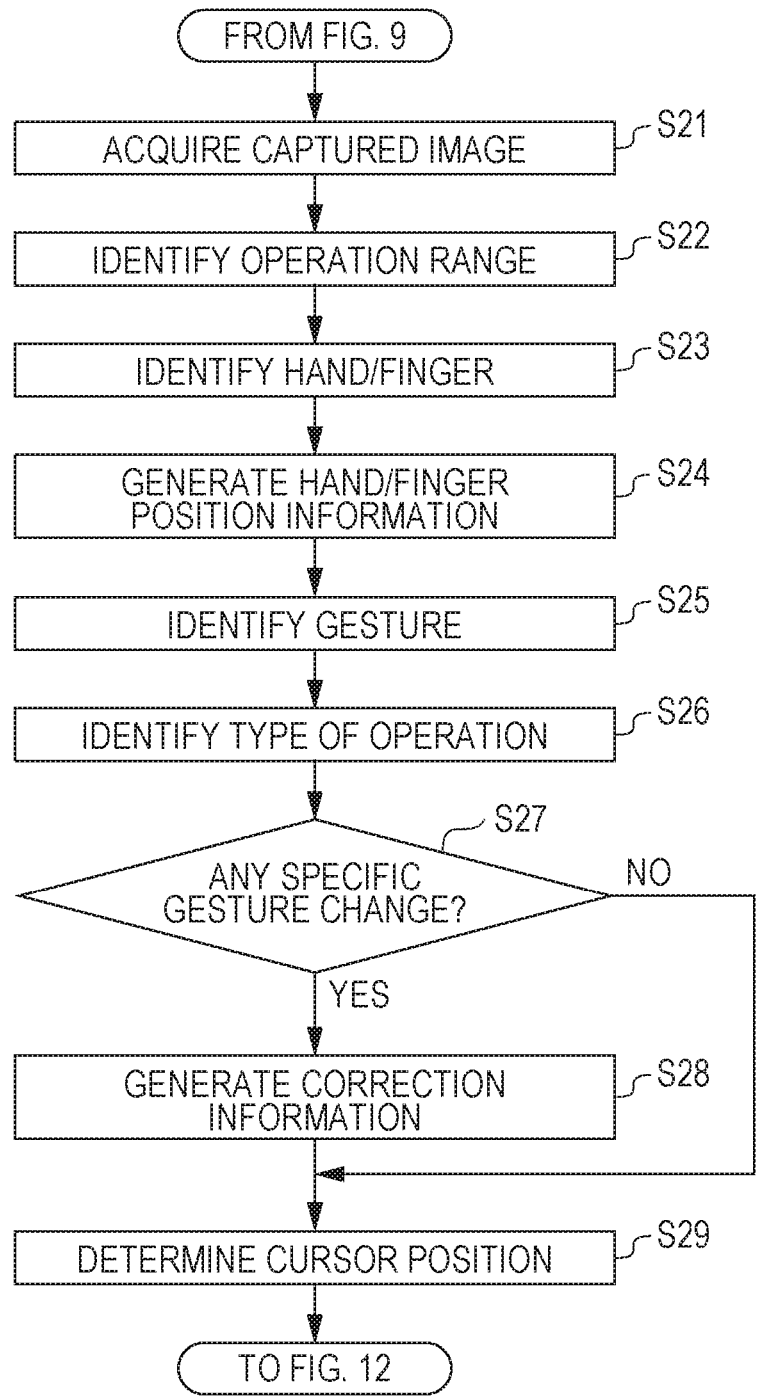

FIG. 15

| GESTURE | OFFSET | |
| --- | --- | --- |
| | offset_x | offset_y |
| NONE | 0 | 0 |
| CLOSED | 0 | 0 |
| POINT | xi − xp | yi − yp |
| OPEN | 0 | 0 |

FIG. 16

| GESTURE | MAPPING EXPRESSION | |
| --- | --- | --- |
| | mj_x | mj_y |
| NONE | xp | yp |
| CLOSED | xp | yp |
| POINT | xi × (1 − offset_x / xi) | yi × (1 − offset_y / yi) |
| OPEN | xp | yp |

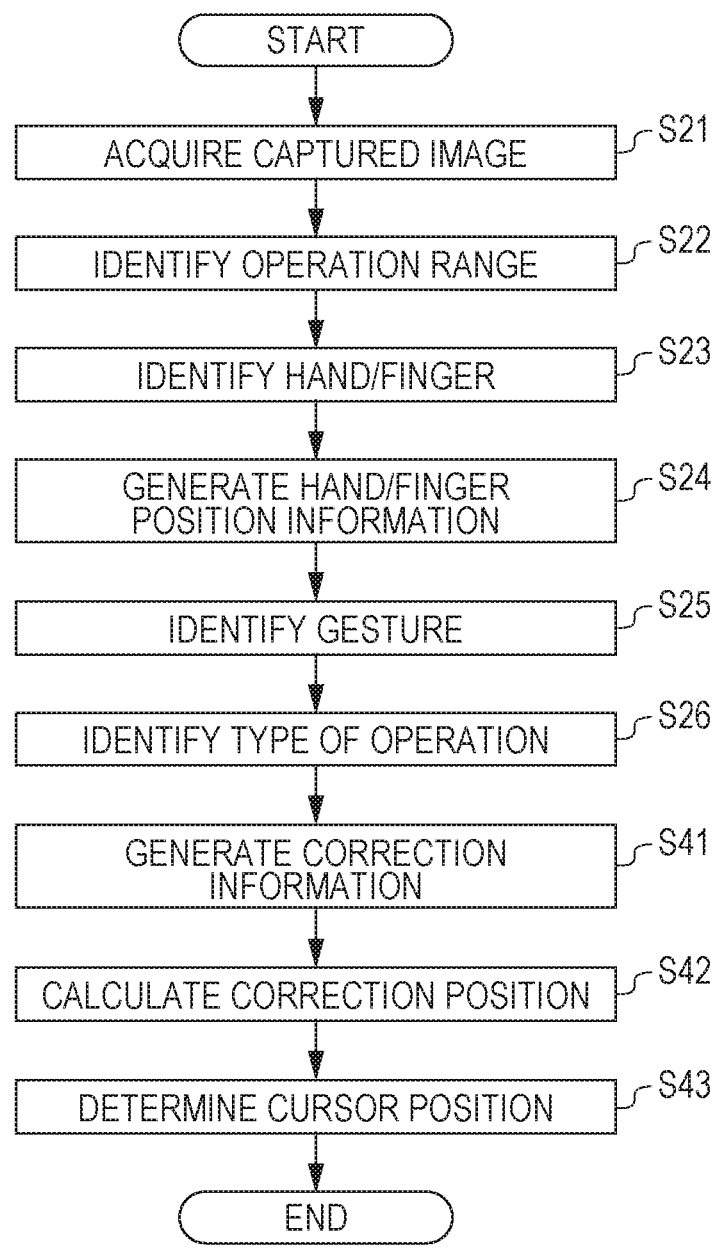

DISPLAY CONTROL APPARATUS, DISPLAY CONTROL METHOD AND RECORDING MEDIUM

BACKGROUND

Technical Field

The present disclosure relates to a display control apparatus, a display control method, and a recording medium for controlling a display position of an instruction image based on an operation performed by an operator.

Description of the Related Art

A method has been proposed in which an operator operating an apparatus performs a specific operation (hereinafter, called a "gesture") near a display device by watching an operation screen displayed on the display device so that the operator can operate the apparatus. Japanese Patent Laid-Open No. 2013-200654 discloses a display control apparatus which detects a movement of a hand of an operator and moves a cursor displayed on a display device in accordance with the detected movement of the hand. Japanese Patent Laid-Open No. 2014-99184 discloses a computer which detects a shape and a movement of a hand of an operator and executes a process corresponding to the shape and movement of the hand of the operator.

However, in the past, because the central position of a hand is identified as the position of the hand, it may be recognized that the position of the hand has changed when the shape of the hand is changed. As a result, the display position of the cursor is changed when the operator has changed the shape of the hand, which may reduce the operationality. For example, when a first operation for operating with a hand closed into a first is changed to a second operation for operating with a tip of the index finger only stretched from the closed hand, the display position of a cursor may possibly changed against the intention of the operator, which may make user's operations difficult.

SUMMARY OF THE INVENTION

An aspect of the present invention provides a display control apparatus including an operation identifying unit configured to identify a type of operation based on a shape of a hand of an operator, and a display controlling unit configured to display an instruction image at an in-screen position corresponding to a first position indicated by the hand having a first shape in a case where a first operation performed by the hand having the first shape is detected and displays an instruction image at an in-screen position corresponding to a second position indicated by the hand having a second shape in a case where a second operation performed by the hand having the second shape is detected, wherein the display controlling unit corrects the in-screen position of the instruction image based on a relationship between the first position and the second position in a case where the second operation is detected after the first operation is detected and displays the instruction image at the in-screen position corresponding to the second position.

Another aspect of the present invention provides a display control method including identifying a type of operation based on a shape of a hand of an operator, a first display step for displaying an instruction image at an in-screen position corresponding to a first position indicated by the hand having a first shape in a case where a first operation performed by the hand having the first shape is detected, and correcting the in-screen position of the instruction image based on a relationship between the first position and a second position different from the first position indicated by the hand having a second shape indicating the second position and a second display step for displaying the instruction image at an in-screen position corresponding to the second position in a case where a second operation performed by the hand having the second shape is detected after the first display step.

Another aspect of the present invention provides a computer-readable recording medium storing a program for causing a computer to execute identifying a type of operation based on a shape of a hand of an operator, a first display step for displaying an instruction image at an in-screen position corresponding to a first position indicated by the hand having a first shape in a case where a first operation performed by the hand having the first shape is detected, and correcting the in-screen position of the instruction image based on a relationship between the first position and a second position different from the first position indicated by the hand having a second shape indicating the second position and a second display step for displaying the instruction image at an in-screen position corresponding to the second position in a case where a second operation performed by the hand having the second shape is detected after the first display step.

Further features of the present invention will become apparent from the following description of exemplary embodiments with reference to the attached drawings.

BRIEF DESCRIPTION OF THE DRAWINGS

FIG. 2A is a first diagram schematically illustrating a configuration of the display system S according to the first exemplary embodiment and illustrating a display state as a result of the first operation.

FIG. 2B is a second diagram schematically illustrating a configuration of the display system S according to the first exemplary embodiment and illustrating a display state as a result of the second operation.

FIG. 4A is a first diagram illustrating a shape of a hand.

FIG. 4B is a second diagram illustrating a shape of a hand.

FIG. 5A is a first diagram illustrating positional information regarding a hand and a positional information regarding a finger.

FIG. 5B is a second diagram illustrating positional information regarding a hand and a positional information regarding a finger.

FIG. 6 illustrates an exemplary hand-shape/gesture correspondence table.

FIG. 11 is a flowchart illustrating an operating procedure from start of image-capturing by an imaging apparatus.

FIG. 15 illustrates a gesture/offset correspondence table usable by a cursor position correcting unit according to a second exemplary embodiment.

FIG. 16 illustrates a mapping expression table usable by the cursor position correcting unit according to the second exemplary embodiment.

FIG. 17 is a flowchart illustrating an operating procedure according to the second exemplary embodiment.

DESCRIPTION OF THE EMBODIMENTS

First Exemplary Embodiment

Outline of Display System S

Figure 1A:
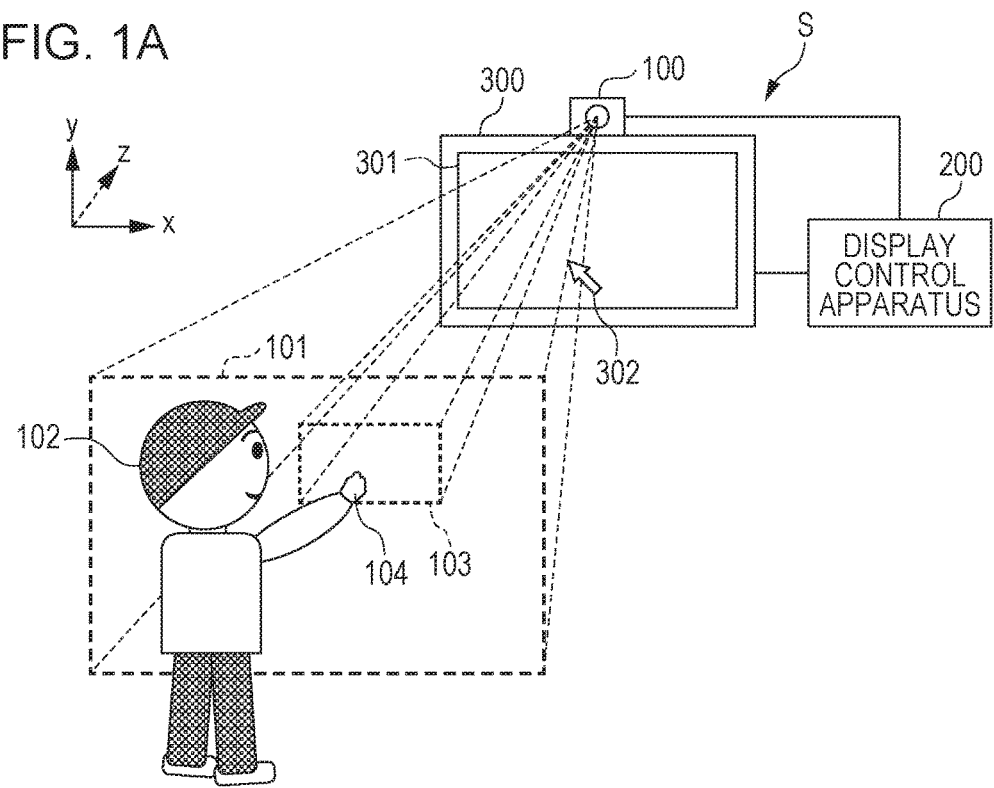
FIG. 1A is a first diagram schematically illustrating a configuration of a display system S according to a first exemplary embodiment and illustrating a display state as a result of a first operation.
Figure 1B:
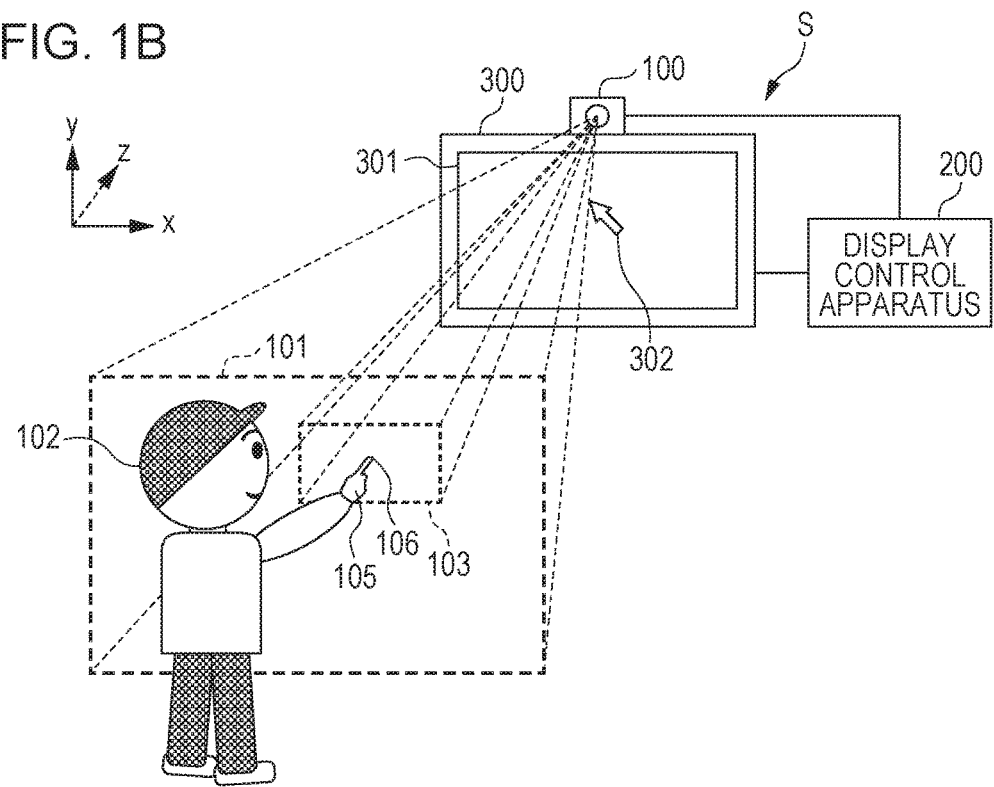
FIG. 1B is a second diagram schematically illustrating a configuration of a display system S according to a first exemplary embodiment and illustrating a display state as a result of a second operation.

FIG. 1A is a first diagram schematically illustrating a configuration of a display system S according to a first exemplary embodiment and illustrating a display state as a result of a first operation. FIG. 1B is a second diagram schematically illustrating a configuration of the display system S according to the first exemplary embodiment and illustrating a display state as a result of a second operation. A display system S includes an imaging apparatus 100, a display control apparatus 200, and a display device 300.

The imaging apparatus 100 may be a camera, for example, and outputs captured image data regarding an imaging range 101 to the display control apparatus 200.

The display control apparatus 200 detects a gesture of an operator 102 at a position apart from the display device 300 based on the captured image data acquired from the imaging apparatus 100 and displays an instruction image at a position corresponding to the gesture on the display screen 301 of the display device 300. The instruction image may be a graphic image to be displayed on the display screen 301 based on an operation performed by the operator 102 and may be a cursor 302, for example.

The display control apparatus 200 determines whether the captured image data includes the operator 102 or not. If it is determined that the captured image data includes the operator 102, an operation range 103 is determined based on human figure information describing a contour of the body of the operator 102. The display control apparatus 200 identifies the positions of the shoulders, arms and hands of the operator 102 by pattern matching, for example, and determines the operation range 103 having a size equal to or smaller than a range in which the operator 102 is capable of moving his or her hand based on the identified positions. In this case, the display control apparatus 200 determines such that the shape of the operation range 103 is a rectangle similar to the shape of the display screen 301 and has sides parallel to the sides of the display screen 301.

The display control apparatus 200 detects a movement and a shape of a predetermined region (such as a hand 104 in FIG. 1A and a hand 105 in FIG. 1B) of the body and determines the type of gesture based on a change of the detected movement and shape to identify the type of operation performed by the operator 102. The display control apparatus 200 controls the content displayed on the display screen 301 on the display device 300 in accordance with the type of operation.

More specifically, when the operator 102 moves his hand 104 having a closed state from outside the operation range 103 to inside the operation range 103, the display control apparatus 200, as illustrated in FIG. 1A, displays the cursor 302 at a position within the display screen 301 corresponding to the position of the hand 104 in the operation range 103. In this state, the relationship between the range of the display screen 301 and the position of the cursor 302 is equal to the relationship between the operation range 103 and the position of the hand 104. When the operator 102 moves the hand 104 from left to right within the operation range 103, the display control apparatus 200 controls the display state of the cursor 302 such that the cursor 302 displayed on the display screen 301 can move from left to right.

As illustrated in FIG. 1B, when the operator 102 moves his or her hand 105 having a finger 106 stretched from the closed hand from outside the operation range 103 to inside the operation range 103, the display control apparatus 200 displays the cursor 302 at a position on the display screen 301 corresponding to the position of the finger 106 in the operation range 103. When the operator 102 moves the finger 106 from left to right within the operation range 103, the display control apparatus 200 controls the display state of the cursor 302 such that the cursor 302 displayed on the display screen 301 can move from left to right.

FIG. 2A is a first diagram schematically illustrating a configuration of the display system S according to the first exemplary embodiment and illustrating a display state as a result of the first operation. FIG. 2A illustrates an identical state to that in FIG. 1A. In other words, FIG. 2A illustrates a state in which the operator 102 moves the hand 104 having a closed state from outside the operation range 103 to inside the operation range 103.

FIG. 2B is a second diagram schematically illustrating a configuration of the display system S according to the first exemplary embodiment and illustrating a display state as a result of the second operation. FIG. 2B illustrates a display state of the cursor 302 when the operator 102 changes the shape of the hand 105 to a state that the finger 106 is stretched to point in the state illustrated in FIG. 2A. In this case, though the position of the finger 106 in the operation range 103 is identical to the position illustrated in FIG. 1B, the position of the cursor 302 on the display screen 301 is identical to the position illustrated in FIG. 2A rather than the position illustrated in FIG. 1B. In this manner, when the operator 102 performs a predetermined operation for changing the shape of the hand 104, such as stretching the finger 106 at a position of the cursor 302 determined by the closed hand 104, the display control apparatus 200 according to this exemplary embodiment prevents the position of the cursor 302 from moving, which may improve the operationality.

Configuration of Display Control Apparatus 200

A configuration of the display control apparatus 200 will be described in detail below.

Figure 3:
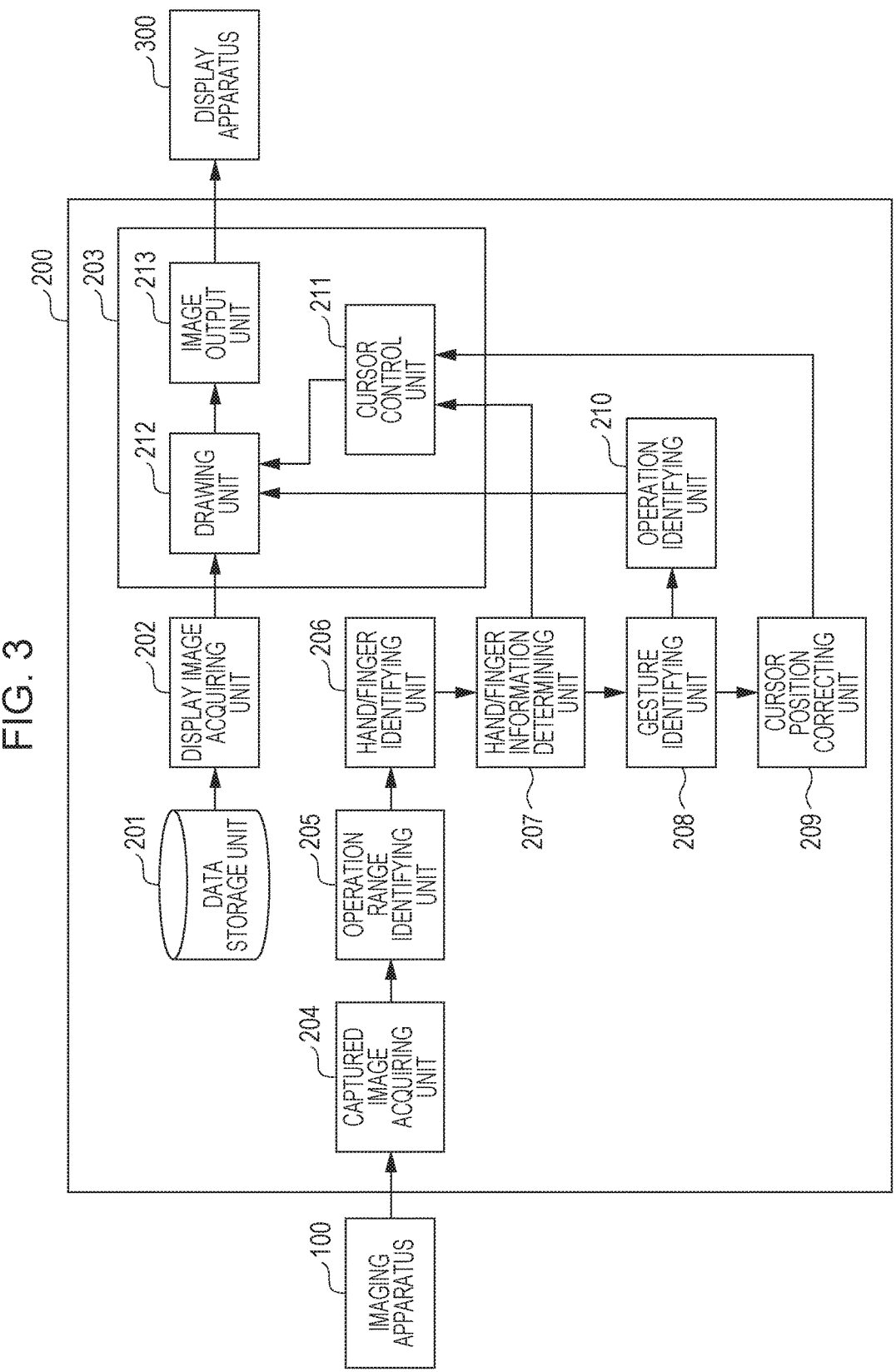
FIG. 3 is a block diagram illustrating a configuration of a display control apparatus according to the first exemplary embodiment.

FIG. 3 is a block diagram illustrating a configuration of the display control apparatus 200 according to the first exemplary embodiment. The display control apparatus 200 has a data storage unit 201, a display image acquiring unit 202, a display control unit 203, a captured image acquiring unit 204, an operation range identifying unit 205, a hand/finger identifying unit 206, a hand/finger information determining unit 207, a gesture identifying unit 208, a cursor position correcting unit 209, and an operation identifying unit 210.

The display control apparatus 200 has a CPU, a ROM, and a RAM, not illustrated. The ROM stores a display control program to be executed by the CPU. The CPU executes the display control program stored in the ROM to control operations of the display control apparatus 200 by using the RAM as a working memory. The ROM stores tables to be used by the CPU for controlling the display control apparatus 200.

The data storage unit 201 stores still images to be displayed on the display screen 301. The data storage unit 201 may be a hard disk, for example.

The display image acquiring unit 202 acquires a plurality of still images from the data storage unit 201, generates still image data acquired by adding index information indicative of the order of images to the still images, and outputs the still image data to the display control unit 203.

The display control unit 203 causes an image to be displayed on the display device 300 based on the still image data input from the display image acquiring unit 202. The display control unit 203 synthesizes a button and the cursor 302 usable for operating to change the image to be displayed with a still image for drawing, generates display image data, and outputs the display image data to the display device 300 to display the image. Details of the display control unit 203 will be described below.

The captured image acquiring unit 204 acquires captured image data including an image acquired by capturing the hand 104 of the operator 102 from the imaging apparatus 100 and outputs the acquired captured image data to the operation range identifying unit 205.

The operation range identifying unit 205 identifies the operation range 103 based on the captured image data input from the captured image acquiring unit 204 and generates operation range information opr including image data acquired by cutting out the operation range 103 from the captured image data. The operation range identifying unit 205 then outputs the operation range information opr to the hand/finger identifying unit 206.

For example, the operation range identifying unit 205 may identify a position sp (xs, ys) of the shoulder and a length la of the arm of the operator 102 included in the captured image data input from the captured image acquiring unit 204 based on body shape information, contour information, or silhouette information of many people prestored in the ROM, for example, and generate human figure information which is information describing the position of the shoulder and the position of the arm.

Next, the operation range identifying unit 205 determines the operation range 103 based on the position sp (xs, ys) of the shoulder and the length la of the arm included in the human figure information. More specifically, the operation range identifying unit 205 calculates the coordinates (upper left op_lu, lower left op_ld, upper right op_ru, lower right op_rd) of four corners of the operation range 103 by using the following expressions.

$$op\_lu(x,y)=(xs-la, ys+la\times 0.5)$$

$$op\_ld(x,y)=(xs-la, ys-la\times 0.5)$$

$$op\_ru(x,y)=(xs+la, ys+la\times 0.5)$$

$$op\_rd(x,y)=(xs+la, ys-la\times 0.5)$$

The operation range identifying unit 205 extracts image data of the operation range 103 from the captured image data based on the calculated coordinates and generates the operation range information opr. The operation range identifying unit 205 outputs the generated operation range information opr to the hand/finger identifying unit 206. According to this exemplary embodiment, image data included in the operation range information opr generated by the operation range identifying unit 205 correspond to a rectangular image of 160 pixels×90 pixels deep.

The hand/finger identifying unit 206 identifies the shape of the hand based on the open/closed states of a plurality of fingers of the operator 102. More specifically, the hand/finger identifying unit 206 may compare the operation range information opr and shape information, contour information, or silhouettes of many fingers prestored in the ROM, for example, to identify the contour of the hand and fingers. The hand/finger identifying unit 206 determines whether fingers are stretched or not based on the identified contours of the hand and fingers to generate hand information h.

The hand information h is a structure including information describing the presence/absence of the hand and the thumb, index, middle, ring, and little fingers. When the hand has a "closed state" in which the hand is not stretched as indicated by the hand 104 illustrated in FIG. 4A, the hand information h contains hand 1, thumb 0, index finger 0, middle finger 0, ring finger 0, and little finger 0. When the state of the hand has a "point state" in which the index finger is stretched as indicated by the hand 104 and finger 106 in FIG. 4B, the hand information h contains hand: 1, thumb: 0, index finger: 1, middle finger: 0, ring finger: 0, and little finger: 0. In the hand information h, the information corresponding to a stretched finger is 1 while information corresponding to an unstretched finger is 0. The hand/finger identifying unit 206 outputs the generated hand information h and the operation range information opr to the hand/finger information determining unit 207.

The hand/finger information determining unit 207 identifies a position of the hand 104 having a first shape in which the operator 102 does not stretch a specific finger as a first position and a position of the finger 106 of the hand 105 having a second shape in which the operator 102 stretches a specific finger (such as the finger 106) as a second position. The hand/finger information determining unit 207 determines positional information regarding the hand and positional information regarding the fingers within the operation range information opr based on the operation range information opr and hand information h, for example. FIG. 5A is a first diagram illustrating positional information regarding the hand and positional information regarding a finger determined by the hand/finger information determining unit 207. FIG. 5B is a second diagram illustrating positional information of the hand and positional information regarding the fingers determined by the hand/finger information determining unit 207.

When the hand information h describes that no finger is stretched, the hand/finger information determining unit 207 only determines positional information hp (xp, yp) of the hand as illustrated in FIG. 5A. The positional information hp (xp, yp) of the hand describes a position of a region in the hand 104 and may be a central position of the hand 104, for example.

When the hand information h describes that one of the fingers is stretched, the hand/finger information determining unit 207 determines the positional information hp (xp, yp) of the hand and positional information fp (xi, yi) as illustrated in FIG. 5B. In the example illustrated in FIG. 5B, because the index finger is stretched, the hand/finger information determining unit 207 determines the positional information fp (xi, yi) of the finger based on the position of the tip of the index finger. The hand/finger information determining unit 207 outputs the positional information hp of the hand and the positional information fp of the finger to the display control unit 203. The hand/finger information determining unit 207 outputs the hand information h, positional information hp of the hand, and positional information fp of the finger to the gesture identifying unit 208.

The gesture identifying unit 208 identifies the type of gesture based on the shape and position of the hand of the operator 102 in a captured image. The gesture identifying unit 208 identifies the type of gesture corresponding to the shape of the hand based on the hand information h input from the hand/finger information determining unit 207 and a hand-shape/gesture correspondence table stored in the ROM. FIG. 6 illustrates an example of the hand-shape/gesture correspondence table.

In the hand-shape/gesture correspondence table illustrated in FIG. 6, information describing whether the hand of the operator 102 is included in the operation range 103, information describing whether any of the fingers is stretched or not, and the type of gesture are associated. A gesture "none" in the hand-shape/gesture correspondence table indicates a state in which the hand is not present within the operation range 103. A gesture "closed" indicates a state in which the hand is closed. A gesture "open" indicates a state in which all fingers are stretched ad the hand is opened. A gesture "point" indicates a state in which the index finger is only stretched and the finger tip of the index finger is executing a process.

The gesture identifying unit 208 identifies gesture information ges(n) describing a gesture corresponding to the shape of the hand every predetermined time period and stores the identified gesture information ges(n) and the hand information h(n) indicating the shape of the hand at that time point in association in the RAM. The gesture identifying unit 208 outputs the gesture information ges(n) to the display control unit 203. The gesture information ges(n) and h(n) is stored in the RAM as arrangement data where n is an integer indicating a position in the arrangement data.

When the immediately preceding gesture information ges(t−1) and the latest gesture information ges(t) have a predetermined relationship, the gesture identifying unit 208 determines that the gesture has changed and outputs a gesture determination result "detected" and the positional information hp of the hand and positional information fp of the finger to the cursor position correcting unit 209. In this case, t is an integer indicating a time when the gesture identifying unit 208 identifies gesture information ges.

When the immediately preceding gesture information ges(t−1) is "closed" and the latest gesture information ges(t) is "point", the gesture change result "detected" indicating that the gesture has changed from "closed" to "point" is notified to cursor position correcting unit 209. The gesture identifying unit 208 outputs a gesture determination result "none" when the gesture identifying unit 208 determines that the gesture has not been changed. Because the central position does not change when the immediately preceding gesture information ges(t−1) is "closed" and the latest gesture information ges(t) is "open", the gesture identifying unit 208 may output the gesture determination result "none".

Figure 7A:
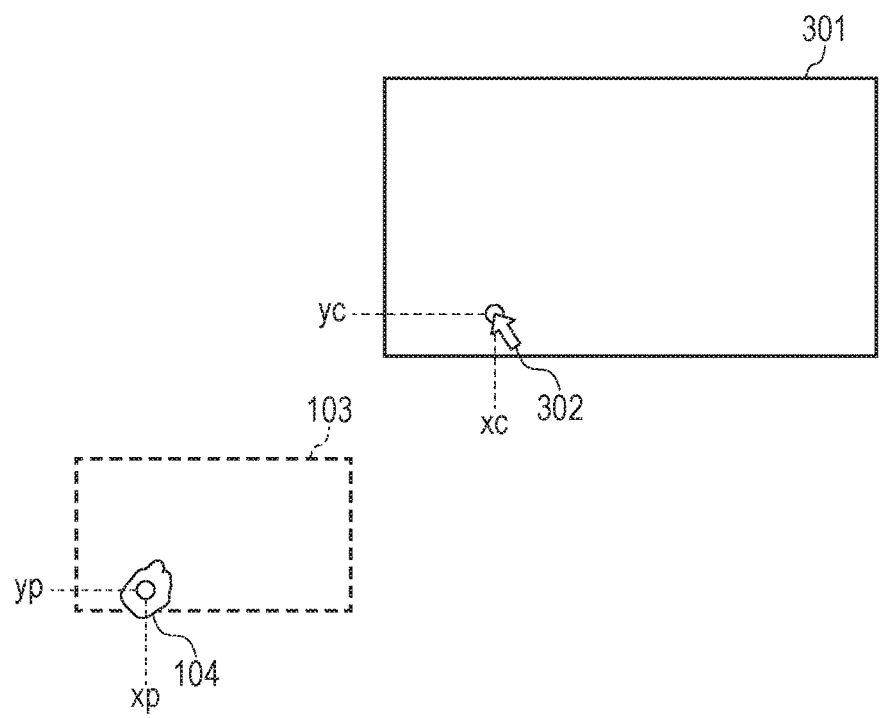
FIG. 7A is a first diagram illustrating a method for calculating cursor-position correction information.
Figure 7B:
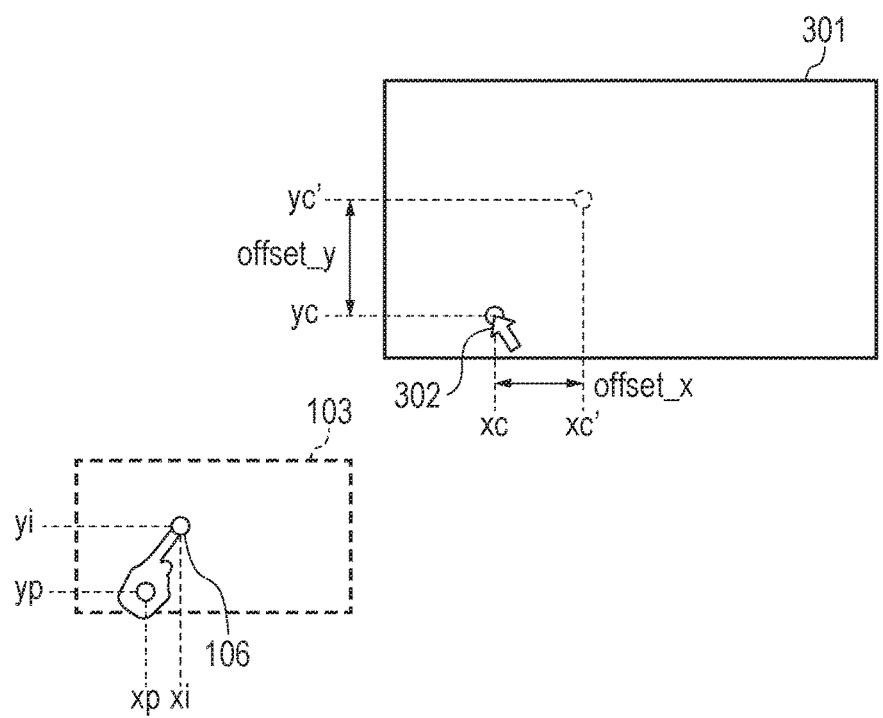
FIG. 7B is a second diagram illustrating the method for calculating cursor-position correction information.

The cursor position correcting unit 209 calculates cursor-position correction information based on the gesture change result, positional information hp of the hand and positional information fp of the finger input from the gesture identifying unit 208. FIGS. 7A and 7B illustrate a method for calculating the cursor-position correction information.

As illustrated in FIG. 7A, the position in the operation range 103 of the hand 104 corresponding to the gesture "closed" is (xp, yp). In this state, the position of the cursor 302 in the display screen 301 is (xc, yc). Here, xc and yc are calculated by the following expressions.

$xc = xp \times$ the number of horizontal pixels of the display screen 301 ÷ the number of horizontal pixels of $opr$ $yc = yp \times$ the number of vertical pixels of the display screen 301 ÷ the number of vertical pixels of $opr$ When the positional information hp (xp, yp) of the hand is (40, 15), the number of horizontal pixels of the display screen 301 is equal to 1920, the number of vertical pixels of the display screen 301 is equal to 1080, the number of horizontal pixels of opr is equal to 160, the number of vertical pixels of opr is equal to 90, xc=40×1920÷160=480, and yc=15×1080÷90=180.

A case will be described in which the operator stretches his/her index finger from the state in FIG. 7A to the state in FIG. 7B. When the tip positional information (xi, yi) of the index finger is (60, 50), the position (xc', yc') in the display screen 301 corresponding to the tip position of the index finger is (720, 600) so that the position of the cursor 302 can move from the position in 7A.

Here, when the gesture change result input from the gesture identifying unit 208 is "detected", the cursor position correcting unit 209 calculates cursor-position correction information cpc (offset_x, offset_y) based on the positional information hp of the hand and positional information fp of the finger by using the following expressions.

$\text{offset\_x} = (xi-xp) \times$ the number of horizontal pixels of the display screen 301 ÷ the number of horizontal pixels of $opr$ $\text{offset\_y} = (yi-yp) \times$ the number of vertical pixels of the display screen 301 ÷ the number of vertical pixels of $opr$ As described above, when (xp, yp)=(40, 15) and (xi, yi)=(60, 50), the cursor position correcting unit 209 calculates as offset_x=240 and offset_y=420. The cursor position correcting unit 209 outputs the cursor-position correction information cpc calculated as described above to the cursor control unit 211.

The operation identifying unit 210 identifies the type of operation based on the shape and position of the hand of the operator 102. More specifically, the operation identifying unit 210 identifies the type of operation corresponding to the gesture based on the gesture information ges, positional information hp of the hand identified based on the shape of the hand of the operator 102, which are input from the gesture identifying unit 208, and gesture-operation conversion table. The operation identifying unit 210 notifies the operation information ope describing the identified type of operation to the display control unit 203.

Figures 8, 9:
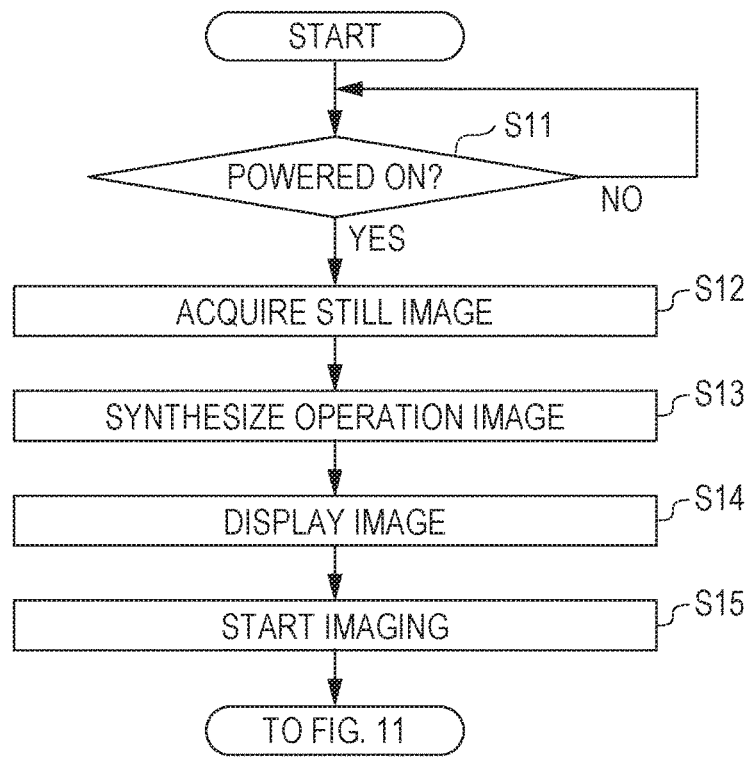
FIG. 8 illustrates an exemplary gesture-operation conversion table.
FIG. 9 is a flowchart illustrating an operating procedure of the display system S.

FIG. 8 illustrates an exemplary gesture-operation conversion table. In the gesture-operation conversion table, the gesture information ges and the type of operation are associated. Referring to FIG. 8, the gesture "closed" corresponds to an operation for moving a cursor, the gesture "point" corresponds to an operation for pressing down a button at a position corresponding to the position of the hand, and the gesture "open" corresponds to an operation for moving an image display position.

The display control unit 203 has a cursor control unit 211, a drawing unit 212 and an image output unit 213. The display control unit 203 displays the cursor 302 at a position (xc, yc) corresponding to a first position (xp, yp) on the hand 104 having the first shape in a captured image based on the first operation performed by the hand 104 having the first shape identified by the operation identifying unit 210. After that, when a second operation having a predetermined relationship with the first operation performed by the hand 105 having the second shape at a second position (xi, yi) different from the first position is detected, the display control unit 203 continuously displays the cursor 302 at the position (xc, yc) within a screen corresponding to the first position based on the relationship between the first position and the second position. The first position (xp, yp) may be the central position of the hand 104, for example, and the second position (xi, yi) may be the position of the tip of the finger 106 of the hand 105, for example.

On the other hand, the display control unit 203 displays the cursor 302 at the position (xc, yc) within a screen corresponding to the first position (xp, yp) based on the first operation performed by the hand 104 having the first shape identified by the operation identifying unit 210, and, after that, when an operation not having a predetermined relationship with the first operation is detected, displays the cursor 302 at a position within the screen corresponding to the position of the hand performing the operation. For example, when an operation is performed by the hand 104 having a closed state and then the operator 102 opens the hand, the display control unit 203 moves the cursor 302 to the position within a screen corresponding to the position of the open hand.

Operations to be performed by components of the display control unit 203 will be described.

The cursor control unit 211 corrects an in-screen position corresponding to the second position by using an in-screen difference corresponding to the difference between the position (xp, yp) of the hand 104 and the position (xi, yi) of the finger 106 in the operation range 103, which is determined based on the ratio between the number of pixels of the operation range 103 and the number of pixels of the display screen 301 to generate cursor positional information cp describing the corrected position. The cursor control unit 211 then notifies the cursor positional information cp to the display control unit 203 so that the cursor 302 can be continuously displayed at the position (xc, yc) within the display screen 301 corresponding to the position of the hand 104.

The cursor control unit 211 calculates the cursor positional information cp based on the positional information hp of the hand and positional information fp of the finger input from the hand/finger information determining unit 207 and the cursor-position correction information cpc input from the cursor position correcting unit 209. First, based on the positional information hp (xp, yp) of the hand and the positional information fp (xi, yi) of the fingers, the cursor control unit 211 first calculates a position (xc', yc') of the finger before corrected by the following expression.

$xc' = xi \times$ the number of horizontal pixels of the display screen 301÷the number of horizontal pixels of $opr$ $yc' = yi \times$ the number of vertical pixels of the display screen 301÷the number of vertical pixels of $opr$ Next, the cursor control unit 211 calculates the cursor positional information cp (xc, yc) by correcting the position (xc', yc') of the finger with the cursor-position correction information cpc (offset_x, offset_y).

$xc = xc' - \text{offset\_}x$ $yc = yc' - \text{offset\_}y$

In this case, as illustrated in FIG. 7B, when (xp, yp)=(40, 15), (xi, yi)=(60, 50), and (offset_x, offset_y)=(240, 420), (xc', yc')=(720, 600) are acquired. Thus, cursor positional information cp (xc, yc)=(480, 180) is acquired. In other words, the position of the cursor 302 is identical to the position of the cursor 302 illustrated in FIG. 7A.

The drawing unit 212 generates display image data based on still image data, operation information ope and cursor positional information cp. More specifically, the drawing unit 212 synthesizes an image based on the still image data, an operation image corresponding to the type of operation described in the operation information ope, and an instruction image corresponding to the cursor 302 at a position described in the cursor positional information cp. The drawing unit 212 identifies the type of operation intended by the operator 102 based on the operation information ope and the cursor positional information cp. The drawing unit 212 changes the display image based on the identified type of operation. The drawing unit 212 outputs the display image data generated by the synthesis to the image output unit 213.

The image output unit 213 may include an HDMI (registered trademark) transmitter. The image output unit 213 outputs the display image data input from the drawing unit 212 to the display device 300.

As described above, when a second operation "PRESS BUTTON" corresponding to the operator 102 stretching the finger 106 is detected, the display control unit 203 displays the cursor 302 at the in-screen position (xc, yc) acquired by correcting the in-screen position (xc', yc') corresponding to the position of the finger 106 based on the difference (offset_x, offset_y) between the first position (position of the hand 104) and the second position. As a result, also when the operator 102 stretches the finger 106, the cursor 302 can be continuously displayed at the in-screen position (xc, yc) corresponding to the first position (xp, yp).

Flowchart of Operations of Display System S

FIG. 9 is a flowchart illustrating an operating procedure of the display system S. FIG. 9 illustrates an operating procedure from the time when the imaging apparatus 100, display control apparatus 200 and display device 300 are powered on to the time when imaging is started by the imaging apparatus 100.

Figure 10A:
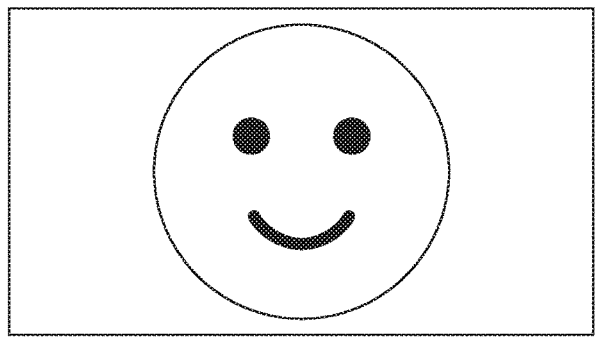
FIG. 10A is a first diagram illustrating a still image acquired by a display image acquiring unit.
Figure 10B:
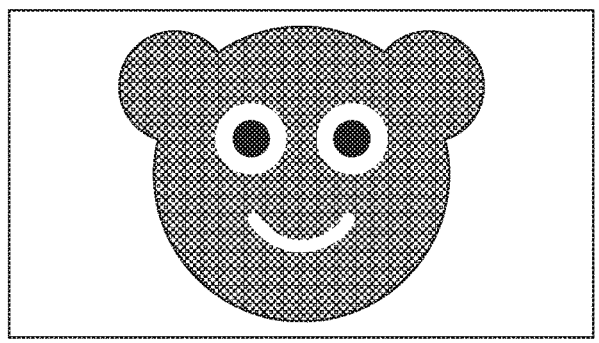
FIG. 10B is a second diagram illustrating a still image acquired by the display image acquiring unit.
Figure 10C:
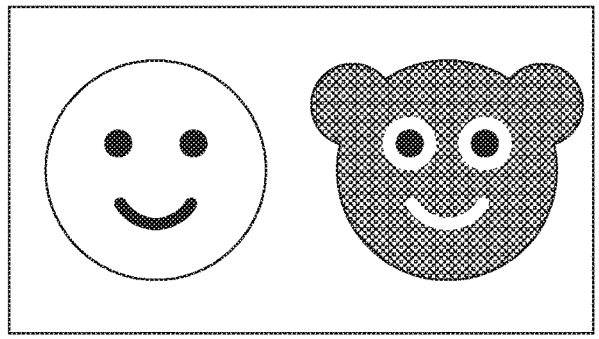
FIG. 10C is a third diagram illustrating a still image acquired by the display image acquiring unit.

The display control apparatus 200 monitors whether the power supply is turned on or not (S11). When the power supply is turned on, it triggers the display image acquiring unit 202 to acquire still image data saved in the data storage unit 201 (S12). FIG. 10A to FIG. 10C illustrate still images corresponding to three pieces of still image data acquired by the display image acquiring unit 202. The display image acquiring unit 202 gives index information to the images in the order of acquisition and outputs the still image data to the drawing unit 212.

Figure 10D:
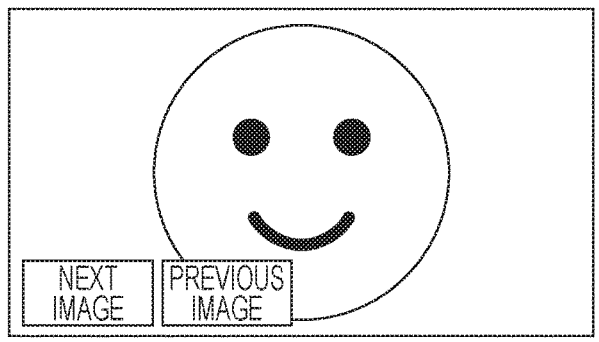
FIG. 10D is a fourth diagram illustrating a still image acquired by the display image acquiring unit.

Next, the drawing unit 212 draws a still image having 0 as the index information, and an operation image is synthesized to the still image, as illustrated in FIG. 10D (S13). The drawing unit 212 generates display image data of vertical 1920×horizontally 1080 pixels based on the synthesized image and outputs them to the image output unit 213. The image output unit 213 displays the input display image data to the display device 300 (S14). FIG. 10D illustrates an image acquired by synthesizing an operation image "NEXT IMAGE" for receiving an operation for shifting to the next image and an operation image "PREVIOUS IMAGE" for receiving an operation for shifting to the previous image.

Next, the imaging apparatus 100 starts imaging, which is triggered by completion of display of the display image data in step S13 (S15). After the imaging apparatus 100 starts imaging, the operator 102 can operate the imaging apparatus 100 by moving the hand 104 within the operation range 103.

Figure 12:
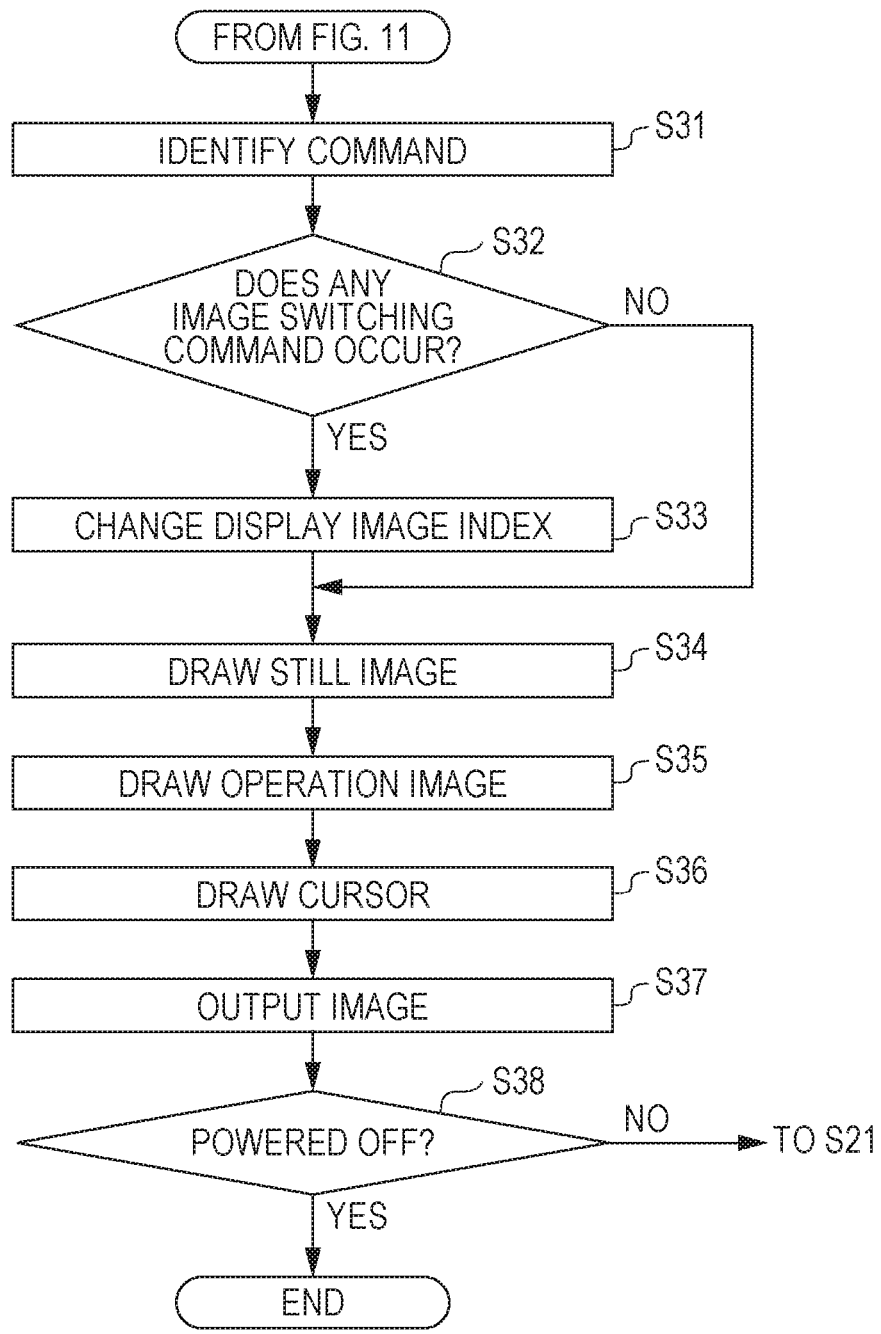
FIG. 12 is a flowchart illustrating an operating procedure for drawing an image to be displayed on a display device by a drawing unit.

Next, with reference to FIG. 11 and FIG. 12, operations will be described for controlling the display position of the cursor 302 by the display control apparatus 200 after the imaging apparatus 100 starts imaging. FIG. 11 is a flowchart describing an operating procedure after the imaging apparatus 100 starts imaging. FIG. 12 is a flowchart illustrating an operating procedure for drawing an image to be displayed on the display device 300 by the drawing unit 212.

Figure 13A:
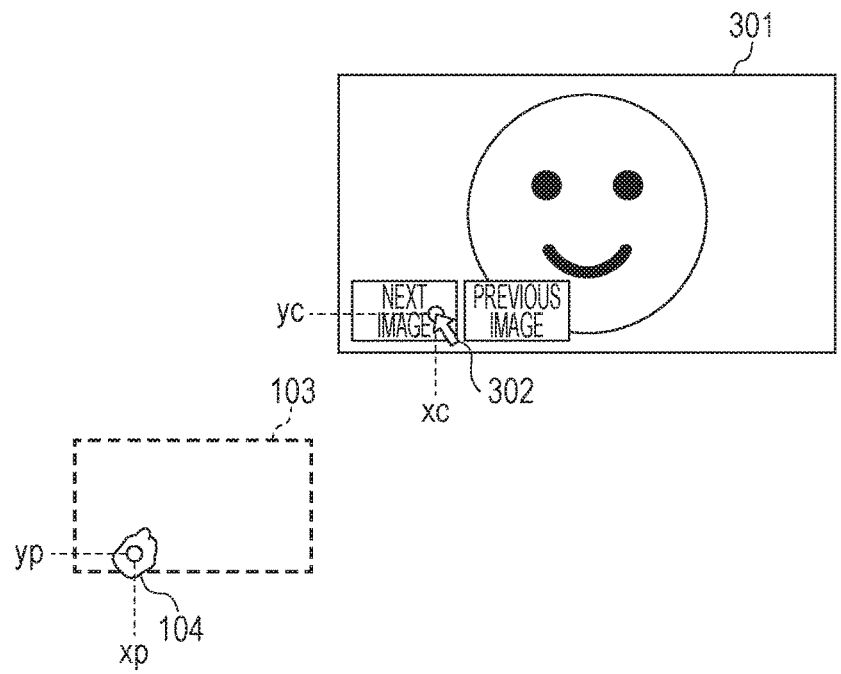
FIG. 13A is a first diagram illustrating an operation for shifting an image to be displayed on a display screen.
Figure 13B:
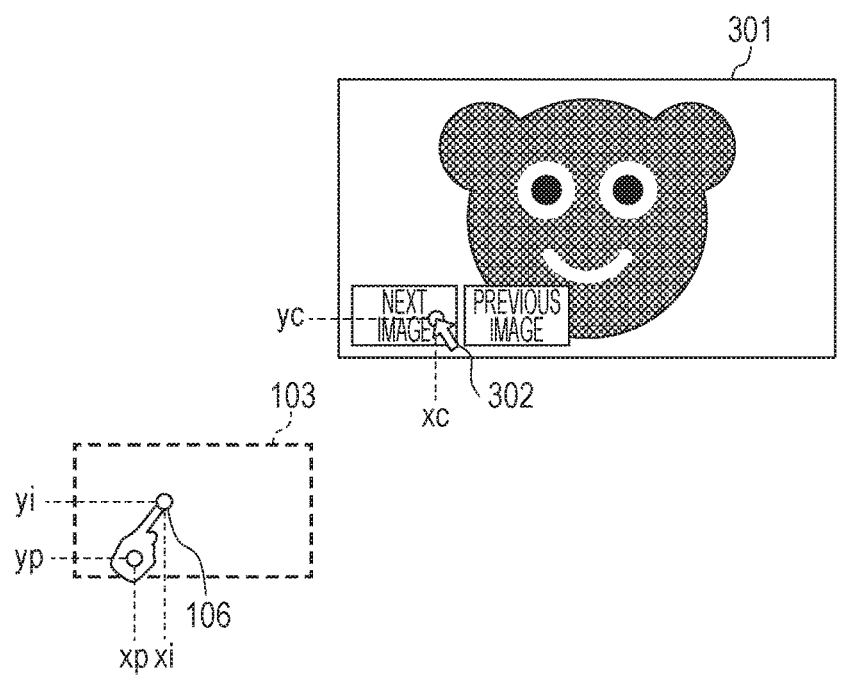
FIG. 13B is a second diagram illustrating an operation for shifting an image to be displayed on a display screen.

In order to describe operations for changing the image to be displayed on the display screen 301, the operations to be performed by the display control apparatus 200 will be described with reference to FIGS. 13A and 13B and FIG. 14. Operations will be sequentially described in a state (hereinafter, called a "first state") in which the operator 102 moves his or her closed hand to the operation range 103, as illustrated in FIG. 13A, a state (hereinafter, called a "second state") in which the operator 102 stretches the index finger as illustrated in FIG. 13B after the first state, and a state (hereinafter, called a "third state") in which the operator 102 moves the stretched index finger after the second state.

Operations in First State

The captured image acquiring unit 204 acquires captured image data (S21) and outputs the captured image data to the operation range identifying unit 205. Here, the operator 102 has his or her hand closed as illustrated in FIG. 13A.

Next, the operation range identifying unit 205 identifies the position of a human figure in the input captured image data to determine the operation range 103, generates operation range information opr acquired by cutting out the image corresponding to the operation range 103 from the captured image data, and outputs it to the hand/finger identifying unit 206 (S22). The hand/finger identifying unit 206 identifies the contours of the hand and fingers based on the input operation range information and generates hand information h (S23). When the hand is closed as illustrated in FIG. 13A, the hand/finger identifying unit 206 generates the hand information h containing hand: 1, thumb: 0, index finger: 0, middle finger: 0, ring finger: 0, and little finger: 0.

Next, the hand/finger information determining unit 207 generates the positional information hp (xp, yp) of the hand within the operation range information opr based on the positional information fp of the finger hand information h (S24). Here, when the hand is closed as illustrated in FIG. 13A, the positional information fp of the finger exhibits no value.

Next, the gesture identifying unit 208 identifies the type of gesture based on the hand information h input from the hand/finger identifying unit 206 and the hand-shape/gesture correspondence table (S25). Here, because the input hand information h contains hand: 1, thumb: 0, index finger: 0, middle finger: 0, ring finger: 0, and little finger: 0 when the hand is closed, the gesture information ges is "closed". The gesture identifying unit 208 sets the type of gesture to gesture information ges(n1) and hand information h to hand information h(n1) and stores them in the RAM. The gesture identifying unit 208 outputs the gesture information ges to the operation identifying unit 210.

The operation identifying unit 210 identifies the operation information ope based on the gesture information ges input from the gesture identifying unit 208 and the gesture-operation conversion table to determine the type of operation (S26). In this case, because the gesture information ges is "closed", the operation identifying unit 210 identifies that the operation information ope is "MOVE CURSOR".

Next, the gesture identifying unit 208 determines whether the relationship between the immediately preceding input gesture information ges(t−1) and the latest gesture information ges(t) indicates a predetermined gesture change or not (S27). Here, the information describing a predetermined gesture change is stored in the ROM. The predetermined gesture change is exemplified by a case where the gesture information ges(t−1) is "closed" and the gesture information ges(t) is "point".

When the gesture information ges is changed from "closed" to "point", the gesture identifying unit 208 generates a gesture change result "detected" and moves to step S28 where correction information is generated. When the gesture information ges(t−1) and gesture information (t) are "point", a gesture change result "continue" is generated. Then, the processing moves to step S28 in which correction information is generated. On the other hand, when the gesture information(t) is "none", it is not included in the predetermined gesture change. Then, the processing moves to step S29 without generating correction information.

Here, in the operation in the first state, gesture information ges(n 0) being an initial value of gesture information ges exhibits no value, and "none" is set as the initial value. When the gesture information ges is changed from "none" to "closed", the cursor position does not require correction. Therefore, the gesture change result in the state in FIG. 13A is "none", and the gesture identifying unit 208 determines that the predetermined gesture change does not occur (No in S27).

Next, the cursor control unit 211 calculates the cursor positional information cp (xc, yc) based on the positional information hp of the hand input from the hand/finger information determining unit 207 and determines the cursor position (S29).

Next, with reference to the flowchart in FIG. 12, the operations to be performed by the drawing unit 212 will be described.

The drawing unit 212 identifies a command instructing the type of operation by the operator 102 based on the operation information ope input from the operation identifying unit 210 and the cursor positional information cp input from the cursor control unit 211 (S31). Next, the drawing unit 212 determines whether the command is an image changing command or not (S32).

If the operation information ope indicates "MOVE CURSOR", the drawing unit 212 determines that the image changing command does not occur (No in S32). The processing then moves to S34 where the still image is displayed (S34). The drawing unit 212 may synthesize an operation image for changing an image to be displayed for performing a cursor moving operation to the in-screen position corresponding to the position of the hand 104 on the first still image illustrated in FIG. 10A, as illustrated in FIG. 13A, for example, and draws the synthesized image on the display screen 301 (S35). The drawing unit 212 synthesizes the cursor 302 to the first still image and draws it on the display screen 301 (S36). Next, the drawing unit 212 outputs the image acquired by synthesizing the still image, the operation image and the cursor 302 to the image output unit 213 (S37).

The display control apparatus 200 repeats the processing from S11 to S37 until the display control apparatus 200 is powered off.

Operations in Second State

Next, as illustrated in FIG. 13B, processing in a case where the operator 102 stretches the index finger will be described. If it is determined in step S38 in FIG. 12 that the power supply is not turned off, the processing returns to S21 in FIG. 11. The processing in step S21 and step S22 is the same as the processing to be performed in the first state in which the operator 102 has his or her hand closed.

After step S22, the hand/finger identifying unit 206 generates hand information h containing hand: 1, thumb: 0, index finger: 1, middle finger: 0, ring finger: 0, and little finger: 0 (S23). Next, the hand/finger information determining unit 207 generates positional information hp (xp, yp) of the hand 104 and positional information fp of the finger within the operation range information opr based on the hand information h (S24).

Next, the gesture identifying unit 208 determines that the gesture information ges is "point" based on the hand information h input from the hand/finger identifying unit 206 hand the hand-shape/gesture correspondence table (S25). The operation identifying unit 210 determines that the operation information ope is "PRESS BUTTON" based on the gesture information ges input from the gesture identifying unit 208 and the gesture-operation conversion table.

Next, because the immediately preceding input gesture information ges(n1) is "closed" and the latest gesture information ges(n 2) is "point", the gesture identifying unit 208 determines that a predetermined gesture change has occurred and outputs a gesture change result "detected" (Yes in S27). The gesture identifying unit 208 outputs the gesture change result, the positional information hp of the hand, and positional information fp of the finger to the cursor position correcting unit 209.

If the gesture change result input from the gesture identifying unit 208 is "detected", the cursor position correcting unit 209 calculates the cursor-position correction information cpc based on the positional information hp of the hand and positional information fp of the finger (S28). The cursor position correcting unit 209 notifies the calculated cursor-position correction information cpc to the cursor control unit 211. The cursor control unit 211 calculates the cursor positional information cp (xc, yc) based on the positional information fp of the index finger and the cursor-position correction information cpc to determine the cursor position (S29).

Next, processing illustrated in FIG. 12 is performed. If a button pressing operation with the stretched finger 106 is detected in a state in which an operation image for changing the display image is displayed, the drawing unit 212 draws a display image to be displayed on the display screen 301 in accordance with the position of the cursor 302 and in response to the button pressing operation. In this case, the drawing unit 212 draws the display image to be shifted when the operation image (such as a "NEXT IMAGE" button) displayed on the display screen 301 is selected for display on the display screen 301.

More specifically, the drawing unit 212 determines that the "PRESS BUTTON" operation has been performed based on the operation information ope (S31). The drawing unit 212 determines that the cursor 302 is over the "NEXT IMAGE" button based on the cursor positional information cp. From the result, the drawing unit 212 determines that an image changing command has occurred (Yes in S32) and changes the index of the image being displayed to change the still image to be displayed (S33).

Next, the drawing unit 212 draws the still image after the change, the operation image and the cursor 302 (S34 to S36) and outputs the draws images to the image output unit 213 (S37). Thus, the images as illustrated in FIG. 13B are displayed. Because the display position of the cursor 302 does not change from the cursor moving operation to the image changing operation, the operator 102 can operate without strangeness.

Operations in Third State

Next, processing will be described in a case where the operator 102 moves the hand 105 having the finger 106 stretched from the state illustrated in FIG. 13B to the right to shift to the state illustrated in FIG. 14. If it is determined in step S38 in FIG. 12 that the power supply is not turned off, the processing returns to S21 in FIG. 11. The processing from step S21 to step S25 is the same as the processing to be performed in the second state.

After step S25, because the immediately previously input gesture information ges(n 2) is "point" and the latest gesture information ges(n 3) is "point", the gesture identifying unit 208 determines that no gesture change has occurred and the gesture is continuing (No in S27).

If the gesture change result input from the gesture identifying unit 208 is "continue" indicating that the gesture is continuing, the cursor position correcting unit 209 uses the cursor-position correction information cpc of the second state in step S28. The cursor position correcting unit 209 notifies the cursor-position correction information cpc to the cursor control unit 211. The cursor control unit 211 calculates the cursor positional information cp (xc, yc) based on the positional information fp of the index finger and the cursor-position correction information cpc to determine the cursor position (S29).

Next, advancing to the processing illustrated in FIG. 12, if the second operation for button pressing by stretching the finger 106 in the second state is detected, the drawing unit 212 draws the cursor 302 at the in-screen position corresponding to the position acquired by correcting the position of the hand 105 based on the difference between the position of the hand 104 and the position of the finger 106 in the operation range 103 if the hand 105 with the finger 106 stretched is moved. The drawing unit 212 further determines that the "PRESS BUTTON" operation has been performed based on the operation information ope (S31). The drawing unit 212 determines that the cursor 302 is prevent on the "PREVIOUS IMAGE" button as illustrated in FIG. 14 based on the cursor positional information cp. From the result, the drawing unit 212 determines that an image changing command has occurred (Yes in S32) and changes the index of the image being displayed to change the still image to be displayed (S33).

Next, the drawing unit 212 draws the still image after the change, the operation image and the cursor 302 (S34 to S36) and outputs the draws images to the image output unit 213 (S37). Thus, the images as illustrated in FIG. 14 are displayed. With the display control apparatus 200 according to this exemplary embodiment, when the operator 102 moves the hand 104 with the index finger stretched and even when the orientation of the hand 105 of the operator 102 or the angle of the finger 106 changes, the cursor 302 can be continuously displayed at a position which is not strange to the operator 102.

Figure 14:
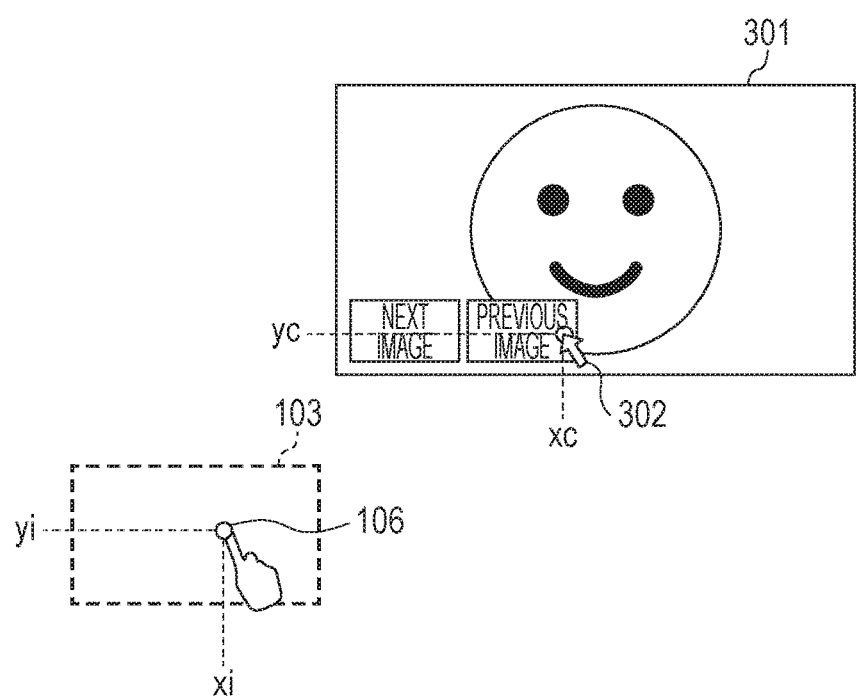
FIG. 14 illustrates an operation for shifting an image to be displayed on a display screen.

When the operator 102 opens the hand 104 or moves the hand 104 to outside the operation range 103 in the state illustrated in FIG. 14, the display control unit 203 finishes the cursor position correction. For example, when an operation performed by the closed hand 104 is detected at a third position different from a first position after the cursor 302 is displayed at the first position, the display control unit 203 displays an instruction image at the in-screen position corresponding to the third position based on the operation performed by the hand 105 with the finger 106 stretched.

Variation Examples

Having described that the operation range identifying unit 205 determines the operation range 103 from the position of the shoulder and the length of the arm of the operator 102, the operation range 103 may be fixed to a specific space coordinate position. The operation range identifying unit 205 may determine the operation range 103 and then move the operation range 103 in accordance with a movement of the operator 102.

Having described above that detection of the operator 102 in the captured image data included in the operator 102 triggers identification of the operation range 103 by the operation range identifying unit 205, detection of a specific gesture performed by the operator 102 may trigger identification of the operation range 103 for prevention of malfunctions.

Having described above a case where one operator performs an operation, if plurality of operators 102 is identified, the display control apparatus 200 may give an operation right to the hand 104 of the firstly identified operator 102 and identify a gesture based on the shape of the hand 104 of the firstly identified operator 102.

The display control apparatus 200 may display a plurality of cursors 302 corresponding to a plurality of hands of a plurality of operators 102 or a plurality of hands of one operator 102 to enable operations using the plurality of hands. For example, in a case where a second hand is included in the operation range 103, the display control unit 203 displays a second cursor 302 corresponding to the second hand at the in-screen position corresponding to the position corrected based on a difference between the position of the second hand and positions of the hand 104 and finger 106. In this case, the display control apparatus 200 may give an operation right to a hand firstly identified within the operation range 103, for example, and identifies the other hand for assisting the operation.

In this case, when the gesture identifying unit 208 detects a specific gesture change from a pointing gesture of the right hand to a pointing gesture of both hands, the cursor position correcting unit 209 may correct the position of the cursor 302 corresponding to the left hand by using a difference value between positional information of a finger of the left hand and positional information of a finger of the right hand as an offset. Thus, in response to a gesture performed by a plurality of hands, the cursor 302 can be displayed at a proper position.

Having described above that the shape of the cursor 302 is an arrow, the cursor 302 may have a hand shape representing open and closed states of five fingers, for example. In this case, the cursor control unit 211 may further correct the cursor position based on a difference value between the tip position of the index finger and the palm position of the cursor 302 such that the tip position of the index finger of the hand-shape cursor 302 can be placed at the in-screen position corresponding to the hand 105 of the operator 102 and the operator 102 can operate further intuitively.

Having described above that the imaging apparatus 100 captures the operator 102 in an X-Y plane, the imaging apparatus 100 may be provided under the operator 102 so that the hand 104 of the operator 102 can be captured in an X-Z plane, for example. In this case, in order to measure a Z coordinate thereof, a stereo camera may be used as the imaging apparatus 100, and the operation range identifying unit 205 may identify the operation range 103 in a three-dimensional space based on a distance image acquired by triangulation. The operation range identifying unit 205 may use a result of a measurement of a Z coordinate by using a distance sensor.

Having described above that the operation identifying unit 210 identifies a type of operation based on the gesture-operation conversion table illustrated in FIG. 8, the correspondence relationship between gestures and types of operation is arbitrary. For example, an open state may correspond to moving a cursor, a shift from an open state to a closed state may correspond to dragging of an image, a closed state may correspond to moving an image and enlargement and reduction of size of the image, and a point state may correspond to drawing on an image. The display control apparatus 200 may change the correspondence relationship dynamically.

According to the configuration described above, a region may sometimes occur in which the cursor 302 is disabled to move by the amount corresponding to the cursor-position correction information cpc for correcting the cursor position. In this case, the operation range identifying unit 205 may provide a larger range for identifying the positions of a hand and a finger of an operator by a size corresponding to the cursor-position correction information cpc, for example, than the operation range 103 to prevent occurrence of a region in which the cursor 302 is disabled to move.

Having described above that the display control apparatus 200 displays a still image on the display device 300, the display control apparatus 200 may display a moving image on the display device 300. Having described above that the display of the cursor 302 is only controlled based on a gesture, a mouse and a keyboard may additionally be used to control the cursor 302.

Having described above that the display control apparatus 200 has the data storage unit 201, the data storage unit 201 may be provided externally to the display control apparatus 200. For example, the display image acquiring unit 202 may acquire an image from a USB memory or may acquire an image from a server connected thereto over a network.

Effects of First Exemplary Embodiment

As described above, in the display control apparatus 200 according to the first exemplary embodiment, the gesture identifying unit 208 identifies the type of gesture based on the shape of a hand and the position of the hand of the operator in a captured image, and the operation identifying unit 210 identifies the type of operation corresponding to the type of gesture. In a case where, after the display control unit 203 displays the cursor 302 at the in-screen position corresponding to the position of the hand 104, if a predetermined operation is detected from the stretched finger 106, the cursor 302 can be displayed continuously without moving the position of the cursor 302 displayed in accordance with the position of the hand 104. Thus, when the operator 102 operates without an intension to move the position of the cursor 302, the position of the cursor 302 is not moved. As a result, the operator 102 can operate without feeling strangeness, and reduction of operationality can be suppressed when the shape of the hand of the operator is changed.

Second Exemplary Embodiment

According to the first exemplary embodiment, the cursor position correcting unit 209 calculates cursor-position correction information cpc (offset_x, offset_y), and the cursor control unit 211 corrects the position of the cursor 302 based on the cursor-position correction information cpc in a coordinate system of the display screen 301. The second exemplary embodiment on the other hand is different from the first exemplary embodiment in that the cursor control unit 211 corrects the cursor position by using a mapping expression mj for calculating a corrected position in a coordinate system of the operation range 103. Differences from the first exemplary embodiment will be described below.

FIG. 15 illustrates a gesture/offset correspondence table to be used by the cursor position correcting unit 209 according to the second exemplary embodiment. FIG. 16 illustrates a mapping expression table to be used by the cursor position correcting unit 209 according to the second exemplary embodiment. The cursor position correcting unit 209 calculates cursor-position correction information cpc describing a correction amount for the position of the finger 106 in a coordinate system of the operation range 103 based on the positional information hp of the hand and positional information fp of the finger. The cursor position correcting unit 209 then calculates the corrected position of the finger 106 in the coordinate system of the operation range 103 based on a mapping expression mj corresponding to gesture information ges included in the mapping expression table and notifies the calculated position to the cursor control unit 211.

The cursor control unit 211 calculates cursor positional information cp based on the corrected position of the finger 106 in the coordinate system of the operation range 103 notified from the cursor position correcting unit 209 and a ratio of the number of pixels of the operation range 103 to the number of pixels of the display screen 301. The cursor control unit 211 then outputs the cursor positional information cp to the drawing unit 212.

FIG. 17 is a flowchart illustrating an operating procedure corresponding to FIG. 11 according to the second exemplary embodiment. The processing in step S21 to S26 in FIG. 17 is identical to the processing in the flowchart illustrated in FIG. 11.

After the operation identifying unit 210 identifies the type of operation in step S26, the cursor position correcting unit 209 generates cursor-position correction information cpc (offset_x, offset_y) in the coordinate system of the operation range 103 based on positional information hp of the hand, positional information fp of the finger, and the gesture/offset correspondence table by using the following expression (S41).

$$\text{offset\_}x = xi - xp$$

$$\text{offset\_}y = yi - yp$$

For example, when the positional information hp of the hand is (40, 15), and the tip positional information of the index finger is (60, 50), offset_x=20 and offset_y=35 are acquired.

Next, the cursor position correcting unit 209 calculates a corrected position mpoint in the coordinate system of the operation range 103 by using a mapping expression corresponding to the gesture information ges identified by the gesture identifying unit 208 on the mapping expression table (S42).

$$m\text{point\_}x = xi \times (1 - \text{offset\_}x \div xi)$$

$$m\text{point\_}y = yi \times (1 - \text{offset\_}y \div yi)$$

In this case, when xi=60 and offset_x=20 are provided, mpoint_x=40 is acquired. When yi=50 and offset_y=35 are provided, mpoint_y=15 is acquired.

The cursor position correcting unit 209 notifies the calculated mpoint value to the cursor control unit 211. The cursor control unit 211 calculates the cursor positional information cp (xc, yc) based on the notified mpoint value by using the following expressions to determine the cursor position (S43).

$$xc = m\text{point\_}x \times \text{the number of horizontal pixels of the display screen } 301 \div \text{the number of horizontal pixels of } opr$$

$$yc = m\text{point\_}y \times \text{the number of vertical pixels of the display screen } 301 \div \text{the number of vertical pixels of } opr$$

When mpoint_x=40 and mpoint_y=15 are provided, and the number of horizontal pixels of the display screen 301 is equal to 1920, the number of vertical pixels of the display screen 301 is equal to 1080, the number of horizontal pixels of opr is 160, and the number of vertical pixels of opr is equal to 90, xc=480 and yc=180 are acquired. Thus, the cursor positional information cp is (480, 180). Therefore, also in this case, the position of the cursor 302 after the operator 102 stretches the finger 106 is not changed from the position of the cursor 302 before the operator 102 stretches the finger 106, like the first exemplary embodiment.

The cursor control unit 211 may map the position in the operation range 103 to the position in the display screen 301 by multiplying another coefficient, instead of the ratio of the number of pixels of the display screen 301 to the number of pixels of the operation region 103, for calculating the cursor positional information cp (xc, yc). For example, the cursor control unit 211 may multiply mpoint by a coefficient having a value decreasing as the distance from the corrected position mpoint in the operation range 103 to the boundary decreases to calculate the cursor positional information cp (xc, yc). Thus, also when the hand of the operator 102 approaches to the boundary of the operation range 103, the cursor 302 can be moved within the display screen 301.

Effects of Second Exemplary Embodiment

As described above, also according to the second exemplary embodiment, when an operation based on a change in shape of a predetermined hand is performed, the position of the cursor 302 does not move. Thus, the operator 102 can operate display control apparatus 200 without feeling strangeness and reduction of operationality can be suppressed when the shape of the hand of the operator is changed, like the first exemplary embodiment. The corrected position mpoint in the coordinate system of the operation range 103 may be mapped to the position within the display screen 301 by using predetermined expressions as in the second exemplary embodiment so that the display control apparatus 200 can flexibly control the relationship between the position of the hand of the operator 102 and the position of the cursor 302.

Having described the present invention with reference to embodiments, the technical scope of the present invention is not limited to the scope of the embodiments, and various changes, modifications, and alterations may be made within the spirit and scope of the present invention.

For example, having described above that a CPU may execute the display control program to identify the shape and position of a hand based on a captured image, embodiments of the present invention are not limited thereto. A CPU may execute the display control program to acquire information describing the shape and position of a hand identified by executing another program and thus to identify the shape and position of the hand. The display control apparatus 200 may not have the captured image acquiring unit 204 and hand/finger identifying unit 206 but may acquire information describing the shape and position of a hand from an external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-160975, filed Aug. 18, 2015, which is hereby incorporated by reference herein in its entirety.

What is claimed is:

1. A display control apparatus comprising:
an operation identifying unit configured to identify a type of operation by identifying a shape of a hand of an operator based on a captured image including the hand; and
a display controlling unit configured to display a cursor at an in-screen position corresponding to a first position indicated by the hand forming a first shape in a case where a first operation performed by the hand forming the first shape is detected and display the cursor at an in-screen position corresponding to a second position indicated by a finger of the hand forming a second shape in a case where a second operation performed by the hand forming the second shape is detected,
wherein the first shape is a shape of a clenched first in which none of fingers of the hand, including the finger, is extended,
wherein the second shape is a shape in which the finger is extended, and
wherein the display controlling unit corrects the in-screen position corresponding to the second position in a case where the second operation is detected after the first operation is detected so as to prevent the in-screen position of the cursor from moving due to the operator's extending the finger.

2. The display control apparatus according to claim 1, wherein the display controlling unit displays the instruction image at the in-screen position corresponding to a third position in a case where the third operation performed by a hand having a third shape indicating a third position different from the first position is detected after the first operation is detected without correcting the in-screen position of the instruction image based on a relationship between the first position and the third position.

3. The display control apparatus according to claim 1, further comprising:
an operation-range identifying unit configured to acquire identify an operation range in which the operator moves the hand based on the captured image including the hand of the operator,
wherein the display controlling unit corrects the in-screen position corresponding to the second position with an in-screen difference corresponding to a difference between the first position and the second position to correct the in-screen position of the instruction image, the difference being determined based on a ratio of the number of pixels of the identified operation range to the number of pixels of the screen.

4. The display control apparatus according to claim 3, wherein the display controlling unit displays a second instruction image corresponding to a second hand at an in-screen position corresponding to the position corrected from a position of the second hand based on the relationship in a case where the operation range includes the second hand.

5. The display control apparatus according to claim 1, wherein the display controlling unit continues to correction the in-screen position of the instruction image based on the relationship in a case where the hand having the second shape is moved after the second operation is detected and moves the instruction image in accordance with a movement of the hand having the second shape.

6. The display control apparatus according to claim 1, wherein the display controlling unit displays the instruction image at an in-screen position corresponding to a third position different from the first position in a case where the first operation performed by the hand having the first shape indicating the third position is detected after the instruction image is displayed based on the second operation.

7. The display control apparatus according to claim 1, wherein the operation identifying unit identifies the shape of the hand based on open/closed states of a plurality of fingers of the operator.

8. The display control apparatus according to claim 1, wherein the display controlling unit displays on the screen a display image corresponding to a position where the instruction image is displayed and a type of the second operation in a case where the second operation is detected.

9. A display control method comprising:
identifying a type of operation by identifying a shape of a hand of an operator based on a captured image including the hand;
a first display step for displaying a cursor at an in-screen position corresponding to a first position indicated by the hand forming a first shape in a case where a first operation performed by the hand forming the first shape is detected;
displaying the cursor at an in-screen position corresponding to a second position indicated by a finger of the hand forming a second shape in a case where a second operation performed by the hand forming the second shape is detected,
wherein the first shape is a shape of a clenched first in which none of fingers of the hand, including the finger, is extended,
wherein the second shape is a shape in which the finger is extended, and
correcting the in-screen position of the instruction image corresponding to the second position in a case where the second operation is detected after the first operation is detected, so as to prevent the in-screen position of the cursor from moving due to the operator's extending the finger.

10. The display control method according to claim 9, the second display step includes displaying the instruction image at the in-screen position corresponding to a third position in a case where the third operation performed by a hand having a third shape indicating a third position different from the first position is detected, without correcting the in-screen position of the instruction image based on the relationship between the first position and the third position.

11. The display control method according to claim 9, further comprising acquiring a captured image including the hand of the operator and identifying an operation range in which the operator moves the hand,
wherein the second display step includes correcting the in-screen position corresponding to the second position with an in-screen difference corresponding to a difference between the first position and the second position to correct the in-screen position of the instruction image, the difference being determined based on a ratio of the number of pixels of the identified operation range to the number of pixels of the screen.

12. The display control method according to claim 11, further comprising displaying a second instruction image corresponding to a second hand at an in-screen position corresponding to the position corrected from a position of the second hand based on the relationship in a case where the operation range includes the second hand.

13. The display control method according to claim 9, further comprising continuing to correction the in-screen position of the instruction image based on the relationship in a case where the hand having the second shape is moved after the second display step and moving the instruction image in accordance with a movement of the hand having the second shape.

14. The display control method according to claim 9, further comprising displaying the instruction image at an in-screen position corresponding to a third position different from the first position in a case where the first operation performed by the hand having the first shape indicating the third position is detected after the second display step.

15. The display control method according to claim 9, further comprising displaying on the screen a display image for executing a process corresponding to a position where the instruction image is displayed and a type of the second operation after the second display step.

16. A non-transitory computer-readable recording medium storing a program for causing a computer to execute:
identifying a type of operation based on a shape of a hand of an operator based on a captured image including the hand;
a first display step for displaying a cursor at an in-screen position corresponding to a first position indicated by the hand forming a first shape in a case where a first operation performed by the hand forming the first shape is detected;
a second display step for displaying the cursor at an in-screen position corresponding to a second position indicated by a finger of the hand forming a second shape in a case where a second operation performed by the hand forming the second shape is detected,
wherein the first shape is a shape of a clenched first in which none of fingers of the hand, including the finger, is extended,
wherein the second shape is a shape in which the finger is extended, and
correcting the in-screen position corresponding to the second position in a case where the second operation is detected after the first operation is detected so as to prevent the in-screen position of the cursor from moving due to the operator's extending the finger.

17. The display control apparatus according to claim 1, wherein the first position indicated by the hand having the first shape is a central position of the hand, and the second position by the hand having the second shape is a tip position of the specific finger.

18. The display control method according to claim 9, wherein the first position indicated by the hand having the first shape is a central position of the hand, and the second position by the hand having the second shape is a tip position of the specific finger.

* * * * *